J. GALLOWAY.
Coffee Roaster.
No. 95,015.
Patented Sept. 21, 1869.
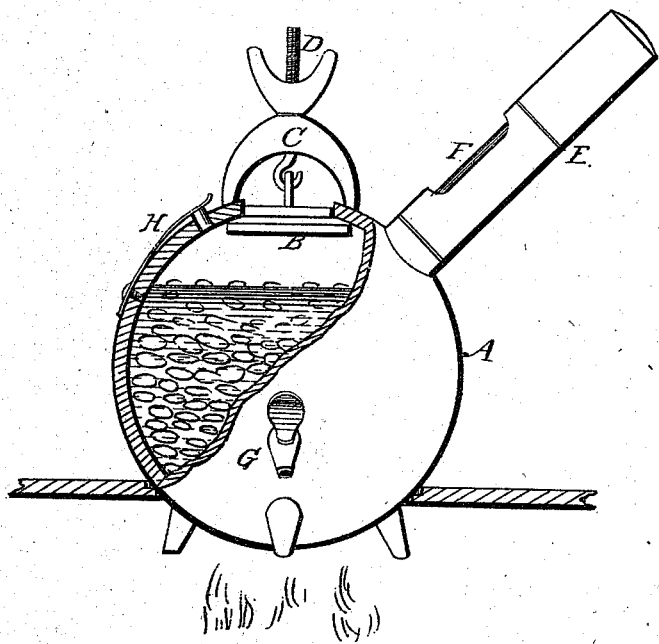
Witnesses:
Inventor:

United States Patent Office.

JAMES GALLOWAY, OF CHETOPAH, KANSAS.

Letters Patent No. 95,015, dated September 21, 1869.

COFFEE-ROASTER.

The Schedule referred to in these Letters Patent and making part of the same.

*To all whom it may concern:*

Be it known that I, JAMES GALLOWAY, of Chetopah, in the county of Labette, and State of Kansas, have invented a new and useful Improvement in Burning and Making Coffee; and I do hereby declare that the following is a full, clear, and exact description thereof, which will enable others skilled in the art to make and use the same, reference being had to the accompanying drawing, forming part of this specification.

This invention relates to a new and useful improvement in the method of preparing coffee, whereby much time is saved, the entire aroma is preserved, and the extraction of the coffee-berry is more complete than by any method heretofore devised; and The invention consists in subjecting the coffee-berry to the action of heat in water, under pressure, as will be hereinafter more fully described.

The accompanying drawing represents a view of a vessel by which I am enabled to carry out my invention; but I do not confine myself to any particular form or size of vessel. It is only necessary that the vessel should be of sufficient dimensions to contain the requisite quantity of coffee and water, and be sufficiently strong to withstand the requisite pressure.

The vessel shown in the drawing is a hollow globe, A, with an aperture, which is closed from the inside by a plate, B, provided with a brace, C, and screw and nut D.

The plate is tightly fitted or packed, so that there shall be no leakage from the vessel after the coffee and water have been placed therein, as seen in the drawing where the side of the vessel is broken away.

E is the handle, to which a thermometer, F, is attached, so that the temperature may be correctly indicated.

G is a faucet, attached to the lower portion of the vessel, for drawing off the extract.

When the vessel is properly filled, it is placed over a fire, (on a stove or otherwise,) and the temperature is raised to, say, 340° Fahrenheit, when ten or fifteen minutes suffices to extract all the valuable qualities of the berry. Should the heat be less than that named, more time is required for a perfect operation.

By this arrangement there is no loss of aroma, as in ordinary roasting, while the entire valuable qualities of the berry are extracted.

A very great saving in the quantity of coffee-berry used is thus secured, while the quality and flavor of the extract is greatly improved. Raw coffee browns at a temperature of about 280° Fahrenheit, but at that degree of heat the process of browning and extracting is somewhat prolonged.

From practice, I have found that a temperature of about 340° Fahrenheit is best calculated for the purpose, as the coffee is browned and the extract obtained in a very short space of time.

For the purpose of rendering the use of the roaster perfectly safe, a safety-valve or fusible plug, of metal, may be applied in any suitable manner, or as seen at H.

Having thus described my invention,

I claim as new, and desire to secure by Letters Patent—

Browning and obtaining the extract of coffee by subjecting the raw coffee-berry to heat when immersed in water, substantially in the manner described.

JAMES GALLOWAY.

Witnesses:
J. R. DEW,
J. W. BRINK.